US011797666B1

(12) United States Patent
Kocher et al.

(10) Patent No.: US 11,797,666 B1
(45) Date of Patent: Oct. 24, 2023

(54) SECURE ENVIRONMENT PUBLIC REGISTER (SEPR)

(71) Applicants: Robert William Kocher, McLean, VA (US); Douglas Earl Dyer, Herndon, VA (US); John Shelly Bowling, II, Reston, VA (US)

(72) Inventors: Robert William Kocher, McLean, VA (US); Douglas Earl Dyer, Herndon, VA (US); John Shelly Bowling, II, Reston, VA (US)

(73) Assignee: Ideal Innovations, Inc., Arlington, VA (US)

( * ) Notice: Subject to any disclaimer, the term of this patent is extended or adjusted under 35 U.S.C. 154(b) by 0 days.

(21) Appl. No.: 17/986,037

(22) Filed: Nov. 14, 2022

Related U.S. Application Data

(60) Provisional application No. 63/282,012, filed on Nov. 22, 2021.

(51) Int. Cl.
*G07B 15/00* (2011.01)
*G06F 21/53* (2013.01)

(52) U.S. Cl.
CPC ............ *G06F 21/53* (2013.01); *G07B 15/00* (2013.01); *G06F 2221/034* (2013.01); *G06Q 2240/00* (2013.01)

(58) Field of Classification Search
CPC ... G06F 21/53; G06F 2221/034; G07B 15/00; G06Q 2240/00
See application file for complete search history.

(56) References Cited

U.S. PATENT DOCUMENTS

| 8,626,641 | B1* | 1/2014 | Merk | G06Q 40/04 705/37 |
|---|---|---|---|---|
| 10,970,549 | B1* | 4/2021 | Krishnan | G06V 20/20 |
| 2011/0047062 | A1* | 2/2011 | Kerschner | G07F 17/00 705/37 |
| 2014/0201033 | A1* | 7/2014 | Crain | G06Q 30/0609 705/26.35 |
| 2017/0024818 | A1* | 1/2017 | Wager | H04L 9/3234 |
| 2019/0028276 | A1* | 1/2019 | Pierce | G06Q 20/3825 |
| 2019/0130484 | A1* | 5/2019 | de Jong | G06Q 20/401 |
| 2019/0253256 | A1* | 8/2019 | Saab | G06Q 20/02 |
| 2019/0337322 | A1* | 11/2019 | Tanko | B42D 25/22 |
| 2023/0082841 | A1* | 3/2023 | Marsh | G06Q 20/389 705/66 |

OTHER PUBLICATIONS

Mohanty, D. (2019). Supply Chain—Gold Tokenization. In: R3 Corda for Architects and Developers. Apress, Berkeley, CA. https://doi.org/10.1007/978-1-4842-4529-3_11 (Year: 2019).*

* cited by examiner

*Primary Examiner* — Scott M Tungate

(57) ABSTRACT

A Secure Environment Public Register (SEPR) provides a method and system that allows precious metals in the shape of ban(s) or units to be certified, specially numbered to provide exact linkage to an owner, allow secure movement of precious metals between secure facilities, and though Blockchain allow secure transfer of ownership between individuals and organizations. The SEPR allows gold and other precious metals to be easily held and traded in commerce with all the advantages of holding precious metals. The SEPR system allows exact audits of the metal bars on hand and avoids over-selling units since each bar is serialized and ownership is documented in a public register.

19 Claims, 11 Drawing Sheets

SECURE ENVIRONMENT PUBLIC REGISTER (SEPR)

CROSS-REFERENCE TO RELATED APPLICATIONS

This application claims priority from U.S. Provisional Patent Application No. 63/282,012, filed on Nov. 22, 2021, titled Secure Environment Public Register (SEPR), the contents of which are incorporated herein by reference, in its entirety.

BACKGROUND

Field of The Invention

This invention relates to the general field of storage, verifying of quality, diversion of storage locations and trading of physical gold with institutions, gold handlers, and individuals.

Description of the Related Art

For thousands of years, gold and other precious metals, such as silver, have been a key storage for wealth, currency and a safe haven during crisis. Gold has also been a traditional hedge against inflation. Current state of the art for ownership of gold is part of a gold fund that hold physical gold, such as the Electronically Trades Fund (ETF) GLD; or owning physical gold. There are several options in owning physical gold. The first option is to buy and hold physical gold at home or in a safe location that you control. The more common approach is to own gold as part of a bank's physical holding. Withdrawing gold out of a bank is relatively complex because many investors want to store their gold in other countries such as Switzerland, Singapore, or United States. When gold is held offshore, there are significant problems getting access and transporting when an owner wants to withdraw the gold. Personal use of gold is also a significant problem. If someone is selling you an ounce of gold, how do you know it is real gold or the amount they claim? How do you know the purity of gold? Person-to-person transfer of gold is risky. Transporting of gold is risky. Security and storage of gold is risky. Person-to-intuition, and the reverse, is also risky. Many of the current physical gold storage facilities state that you have a piece of the large gold block. This approach has the risk of the facility selling more pieces of gold than they physically have on hand. This can lead to a significant shortage should owners wish to withdraw their amount of gold. The prior art has not solved these problems in any way that the common man can avoid the significant risks of owning and trading physical gold. Transferring gold from one country to another involves a lot of local and international rules and regulations.

From all of the above, there exists a need for a system that overcomes the above-described problems associated with the current state of the art.

SUMMARY OF EXEMPLARY EMBODIMENTS OF THE INVENTION

To overcome the problems associated with the current state of the art, and to provide a safe, secure method of trading gold or other precious metals, a system and method are provided which provide quality verification, storage, and transactions in a secure environment and meeting government laws and regulations using a blockchain public register, allowing individuals and institutions a novel method for use of physical precious metals such as gold.

The Secure Environment Public Register is a method and system that allows precious metals bar or units to be certified, specially numbered to provide exact linkage to an owner, allow secure movement of precious metals between secure facilities, and through blockchain, allow secure transfer of ownership between individuals, organizations, international institutions, and countries. The SEPR allows gold and other precious metals to be easily in commerce with all the advantages of holding precious metals. The SEPR system will also allow exact audits of the metal bars on hand and avoid over-selling units since each bar is serialized and ownership is documented in a public register.

The primary embodiment of the Secure Environment Public Register (SEPR) system is built on one or more secure storage facilities connected with secure transfer transportation equipment that verifies shipping and receipt of precious metals between secure facilities, different locations, countries, or with the metal owners. The secure environment has controlled entry and exit points for accepting metals, analyzing metals, refining metals to achieve the proper quality, forming metals to a designated weight, engraving, packaging, serial numbering, each metal bar, then entering each serial-numbered metal bar into a register. Each secure facility has exact accountability of the metal bars it holds. The register can be a blockchain register, Non-Fungible Token (NFT) or any other public register system. The blockchain, NFT, or other public register system confirms to the owner assurances of quality, quantity, location, and security whereby the system allows for secure transfer of metals between secure storage facilities either physically or virtually, and to and from individuals and between individuals. The serial number can be on the bar or the packaging, or both.

The secure environment has one of more said secure facilities, secure entry and exit points. The entry points are configured to receive, inspect, process, and verify quality of metals entering the secure environment. The entry points have instruments to measure the weight and quality of metal they are receiving in the secure facility. The secure facility has a machine that can processes metals entering the secure facility and can form metal bars to specific quality and weight specified in a bar unit. The entry point has equipment for engraving or labeling metal bars with a unique identification number. The secure facility has a register and documents each metal bar to include physical location and assigned owner. Each secure storage facility has a secure structure sufficient for storage of metal bars, a secure access protocol to maintain security and accountability of metal bars.

The secure environment has a secure transportation system which allows secure transfer of said gold bars between secure facilities.

The secure environment has a secure ownership accountability system, such as a blockchain register system to document ownership, transactions, and physical location of each metal bar.

Metal bar location is important since investors may want to locate different quantities of bars in different countries. A key factor in owning physical gold is deciding which countries you want to locate the physical gold or other precious metals. International uncertainty and crises play a major part in diversification and confidence levels where to store precious metals. The SEPR system allows storage and transferring of metal bars between countries seamlessly and documented in a public register. The SEPR system would take into consideration international laws, storage requirements, and banking protocols.

The primary embodiment of the SEPR system is using gold and silver and other metals. An alternate embodiment of the SEPR method and system is using other metals such as palladium, copper, or rare earth minerals.

LIST OF REFERENCE NUMERALS FOUND IN THE DRAWINGS

Figure 1:
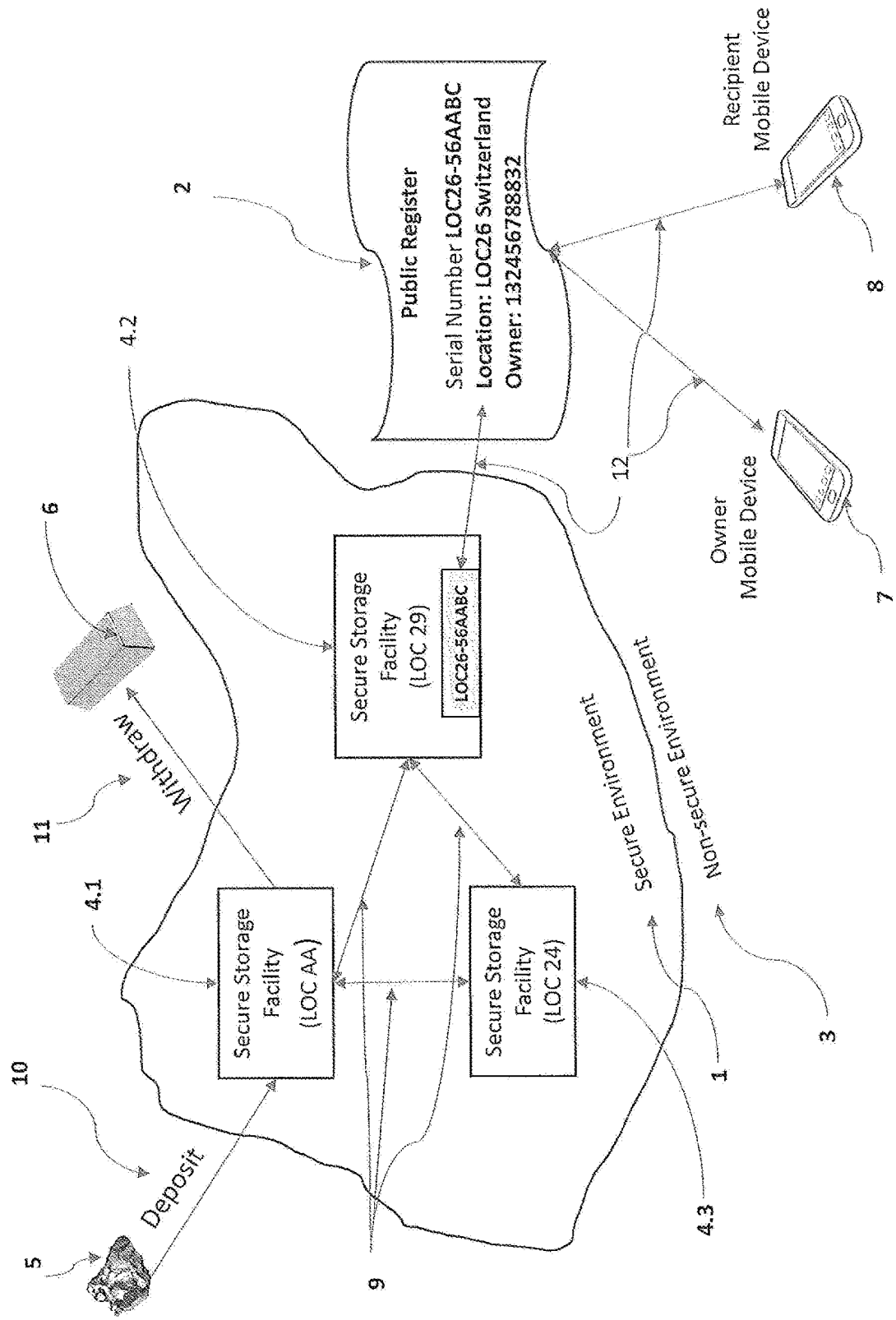
FIG. 1 depicts the primary components of the Secure Environment Public Register system and method.

Element 1 represents the secure environment of the SEPR system.

Element 2 represents the public register.

Element 3 represents the unsecure environment outside the secure environment.

Element 4 represents a secure storage facility(s).

Element 4.1 represents a specific secure storage facility.

Element 4.2 represents a specific secure storage facility.

Element 4.3 represents a specific secure storage facility.

Element 4.4 represents a specific secure storage facility.

Element 4.5 represents a specific secure storage facility.

Element 4.6 represents a specific secure storage facility.

Element 5 represents a precious metal prior to entering the secure environment.

Element 6 represents a precious metal bar departing the secure environment.

Element 7 represents a mobile communications device.

Element 8 represents a mobile communication device.

Element 9 represents secure communications and transfer links between secure facilities.

Element 10 represents the deposit and process procedures and equipment for producing precious metal bars.

Element 11 represents the withdrawal process of the unique precious metal bar from the secure area to the owner.

Element 12 represents the communications link, connecting to the public register document monitoring and recording all transactions.

Element 13 represents the precious metal quality inspection equipment and process.

Element 14 represents the equipment and process to form metal bar(s).

Element 15 represents adding serial number, identification number to metal bar and/or label or packaging.

Element 16 represents a certified and serial numbered metal bar.

Element 17 represents the certified and serial numbered metal bar entering the storage process in a secure storage facility.

Element 18 represents documentation of the storage location in the secure storage facility.

Element 19 represents entering the metal bar information into the public register.

Element 20 represents withdrawal instructions between the owner's communication device and the secure storage facility.

Element 21 represents the secure storage facility verifying ownership and identifying the location of the serial numbered metal bar.

Element 22 represents modifying storage location information from metal bar. identification number or in accordance with procedures to remove the metal bar(s) from the secure environment.

Element 23 represents shipping or transporting the metal bar(s) to the owner's requested location.

Element 24 represents verification of receipt of metal bar(s).

Element 25 represents both owner's communication device and secure storage facility updating the public register server of the completed transfer.

Element 26 represents the communication from a communications device to a secure storage facility to transfer within the secure environment to transfer metal bar(s) to another secure storage facility in order to diversify holding in several different countries or locations.

Element 27 represents communication from the current metal bar holding secure storage facility informing the requested secure storage facility for a virtual transfer or physical transfer within the secure environment.

Element 28 represents the second secure storage facility selecting self-owned or unassigned metal bars and informs first security storage facility of a virtual transfer by trading an equal number of serial number bars and updating the public register server.

Element 29 represents updating the public register server of the change in location and serial number.

Element 30 represents a request from one secure storage facility to another to ship or receive additional metal bars.

Element 31 represents and agreement from a second storage facility to ship or receive additional metal bars.

Element 32 represents a secure shipping transaction of metal bars between secure storage facilities.

Element 33 represents the two secure storage facilities agreeing on serial number location changes and update the Public Register Server.

Element 34 represents a metal bar's characteristics selected from a list of composition quality, weight, authenticity, certification, identification number, serial number or storage location.

Element 35 represents data in public ledger or blockchain ledger.

Element 36 represents physical and virtual transfer of metal bars inside the secure environment.

Element 37 represents depositing metal in bulk or bar forms.

Element 38 represents withdrawing metal bar(s) from the secure environment.

DETAILED DESCRIPTION OF EXEMPLARY EMBODIMENTS OF THE INVENTION

With the invention of Blockchain, Public Key Infrastructure (PKI), internet connectivity, Non-Fungible Tokens, a revolutionary approach has been developed with a configuration of our invention that solves current problems with owning, securing, storing, trading, and transferring gold and other precious metals.

FIG. 1 depicts a primary embodiment of the SEPR. A secure environment 1 is established comprising secure storage facilities 4, 4.1, 4.2, and . . . 4.n; secure storage facilities transfer gold bars virtually or physically through secure links 9, within the secure environment 1. A secure environment 1 differs from a non-secure environment 3 in such a manner that the metal bars remain in a secure environment and are not stored with the owner. The owner may withdraw 11 of the bars 6 from the secure environment, but the bars are no longer considered part of the secure system. Should an owner want to deposit 10 bars of gold 5 back into the secure environment, the bars have to go through a secure storage facility 4 where bars are created or recertified 6. This unique feature of an embodiment of this invention provides assurance that all bars within the secure environment are certified and accounted for, at each location. This provides confidence among individuals and organizations that trade metal bars.

The facilities within the secure environment 1 communicate with a public register 2 documenting all transactions, locations, and quantities of metal bars. Metal bar owners communicate through the Internet 12 on mobile devices 7 in order to conduct transactions to recipients through the Internet 12 and mobile device 8. Raw and bar metal deposits 5 are made in a secure facility for processing 10. Withdrawals 11 can be made by owners requesting their bar 6 or bars.

Figure 2:
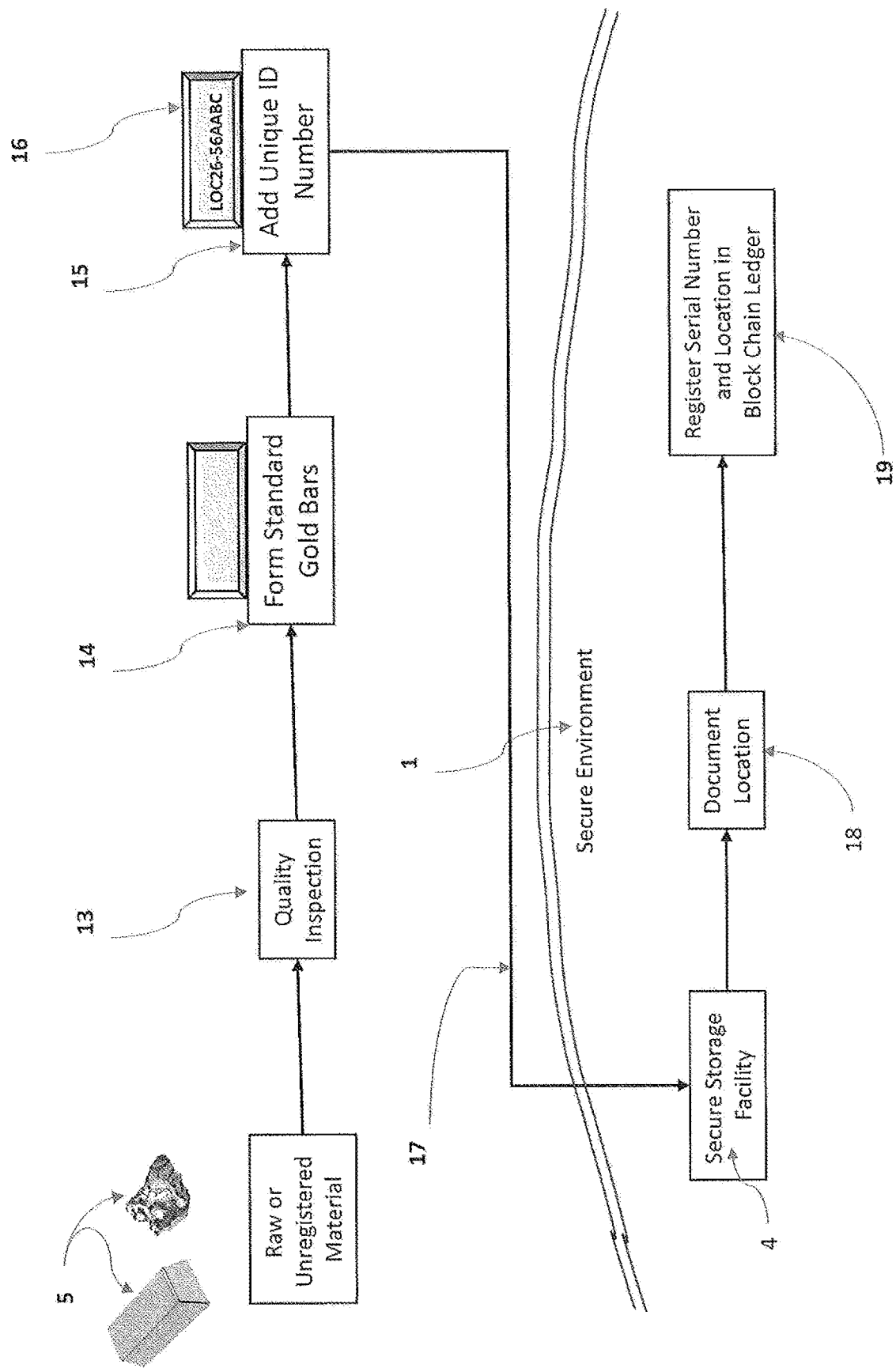
FIG. 2 depicts a process for raw or unregistered precious metals entering the secure environment and secure storage facility.

FIG. 2 depicts the detailed process of entering raw or unregistered material 5 into a secure environment. The raw unregistered material 5 is inspected 13 for material quality, fineness, and composition. The material is processed to form standard metal bars of specific uniform characteristics that will allow for trade. Unique ID numbers 15 and identification information are added to each of the metal bars in order to create a unique metal bar 16. Once the unique metal bars 16 are created, they are officially entered 17 into the secure environment 1 at a secure facility 4. The secure facility 4 adds location information 18 for each metal bar and enters the data 19 into the public register 2.

Figure 3:
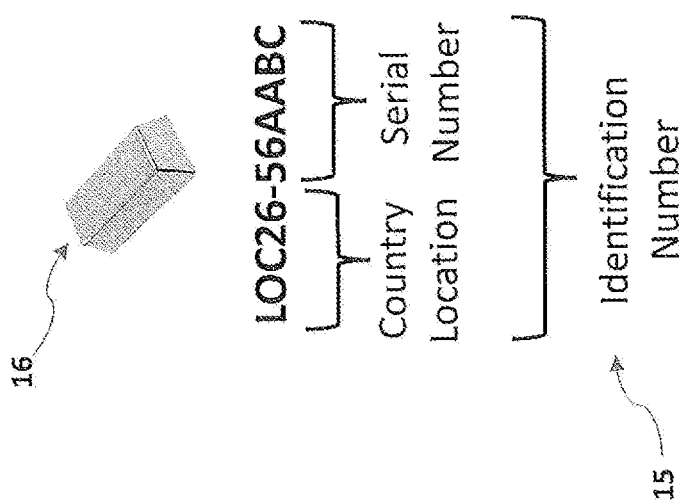
FIG. 3 depicts a construction of an identification number.

FIG. 3 depicts how a metal bar 16 is tracked and identified by a combination of country, location, and secure storage facility location 15. An alternate embodiment for tracking can be utilizing the same identification number 15 and tracking location in the public register 2.

Figure 4:
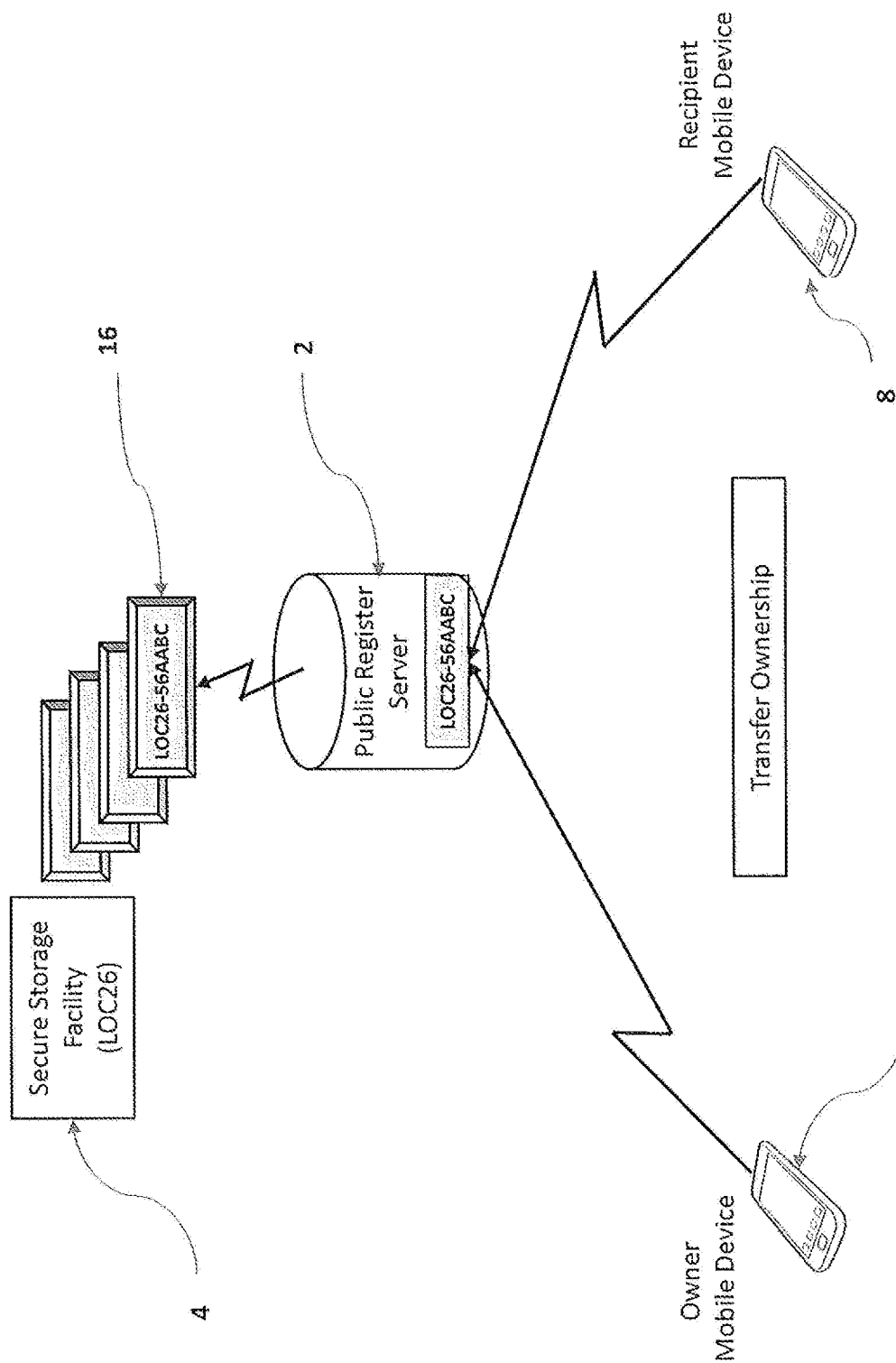
FIG. 4 depicts transfer of a metal bar ownership between two mobile devices.

FIG. 4 depicts the transfer of ownership from a mobile device 7 to a recipient's device 8 documented on the public register 2. The owner certifies his ownership of a gold bar 16 located at secure storage facility 4, as proof of ownership and availability for transfer of the gold bar or other metal bar. This transfer is done in accordance with standard blockchain, NFT, Internet business processes such as EIP-721. EIP-721 is the standard industry process. These transactions could also be represented by NFTs, using the standard practice described in EIP-721. As an alternative, a separate, privately controlled entity could be specifically set up for brokering the transactions between individuals, organizations and corporations.

Figure 5:
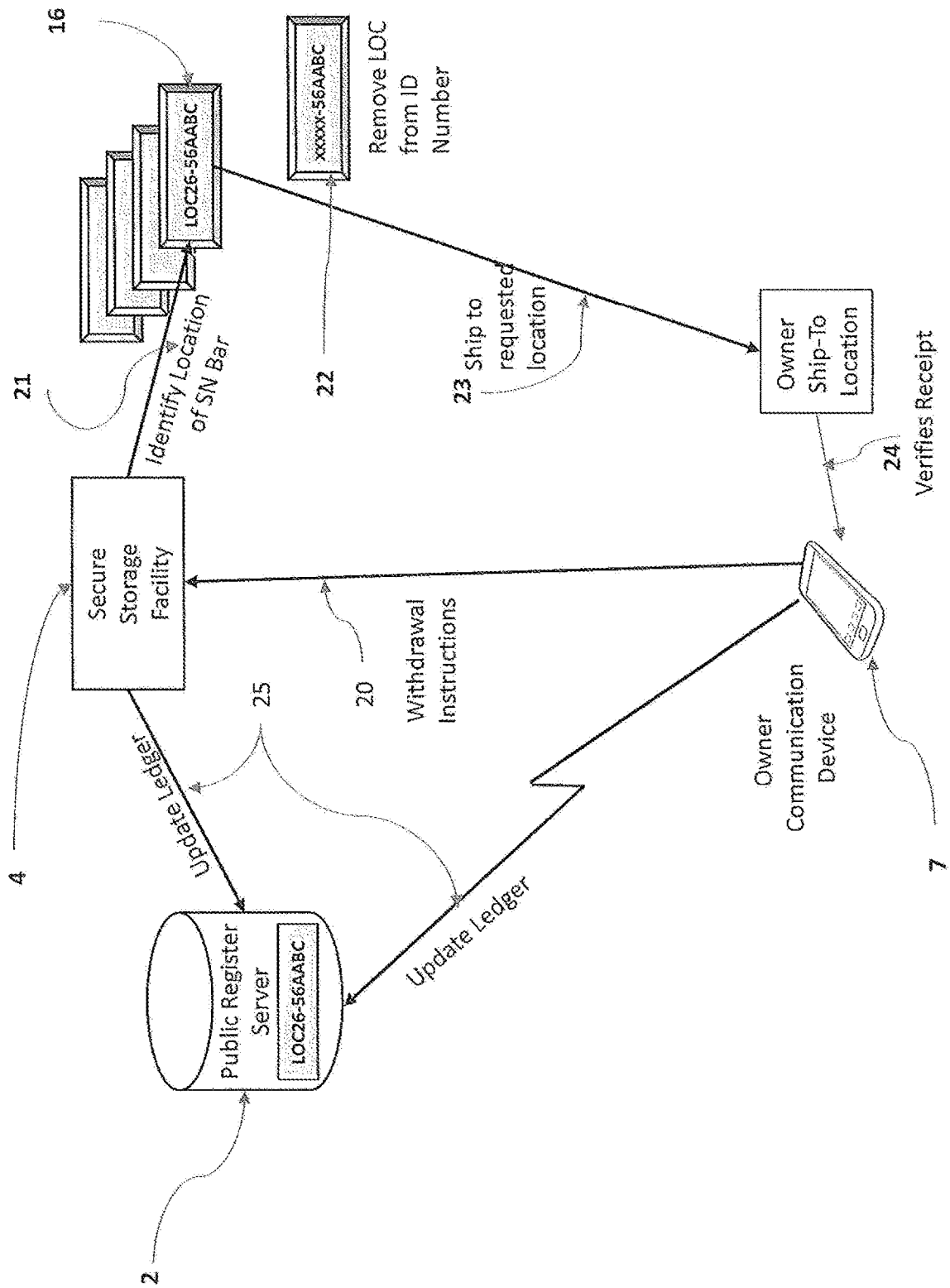
FIG. 5 depicts the process to withdraw a metal bar from the secure environment.

FIG. 5 depicts the process for an owner requesting to receive his metal bar 16. The owner's communication device 7 communicates to the secure storage facility 4 a request for his documented gold bar(s) 16. The secure storage facility 4 then identifies the location 21 of the gold bar 16. The secure storage facility 4, along with the owner's communication device 7 would update 25 the public register 2. The secure storage facility 4 would then de-process the gold bar 16 by removing specific location information 22 and shipping the de-processed gold bar 22 to the owner's requested location 23. The owner then verifies receipt 24.

Figure 6:
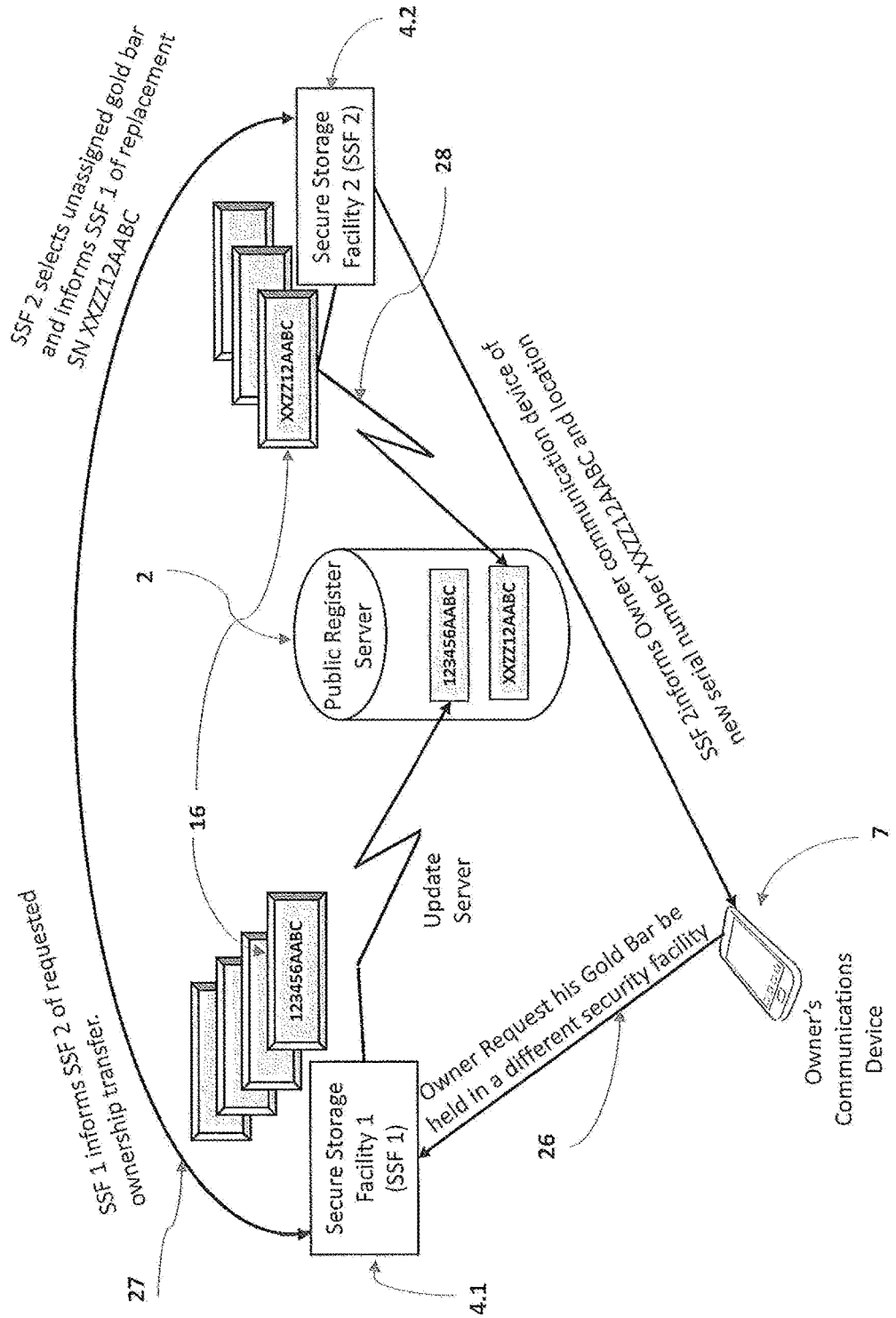
FIG. 6 depicts the process to transfer ownership virtually to a new location within the secure environment.

FIG. 6 depicts an owner's request to virtually transfer metal bars to a new location. Owner's communication device 7 then sends a request 26 to secure storage facility 4.1 where the owner's metal bar 16 currently resides, in order to transfer the metal bar 16 to a specific new storage facility 4.2 in a different location or country. Secure storage facility 4.1 requests a virtual transfer 27 to transfer an equivalent metal bar 16. Secure storage facility 4.2 selects unassigned metal bars and informs secure storage facility 4.1 of replacement identification number. Secure facility 4.2 and secure facility 4.1 both update the public register 2 of the change of ownership of metal bar 16 through the equivalent bar with different location and serial number. Secure facility 4.2 informs owner's communication device 7 of the new serial number and location as documented in the public register.

Figure 7:
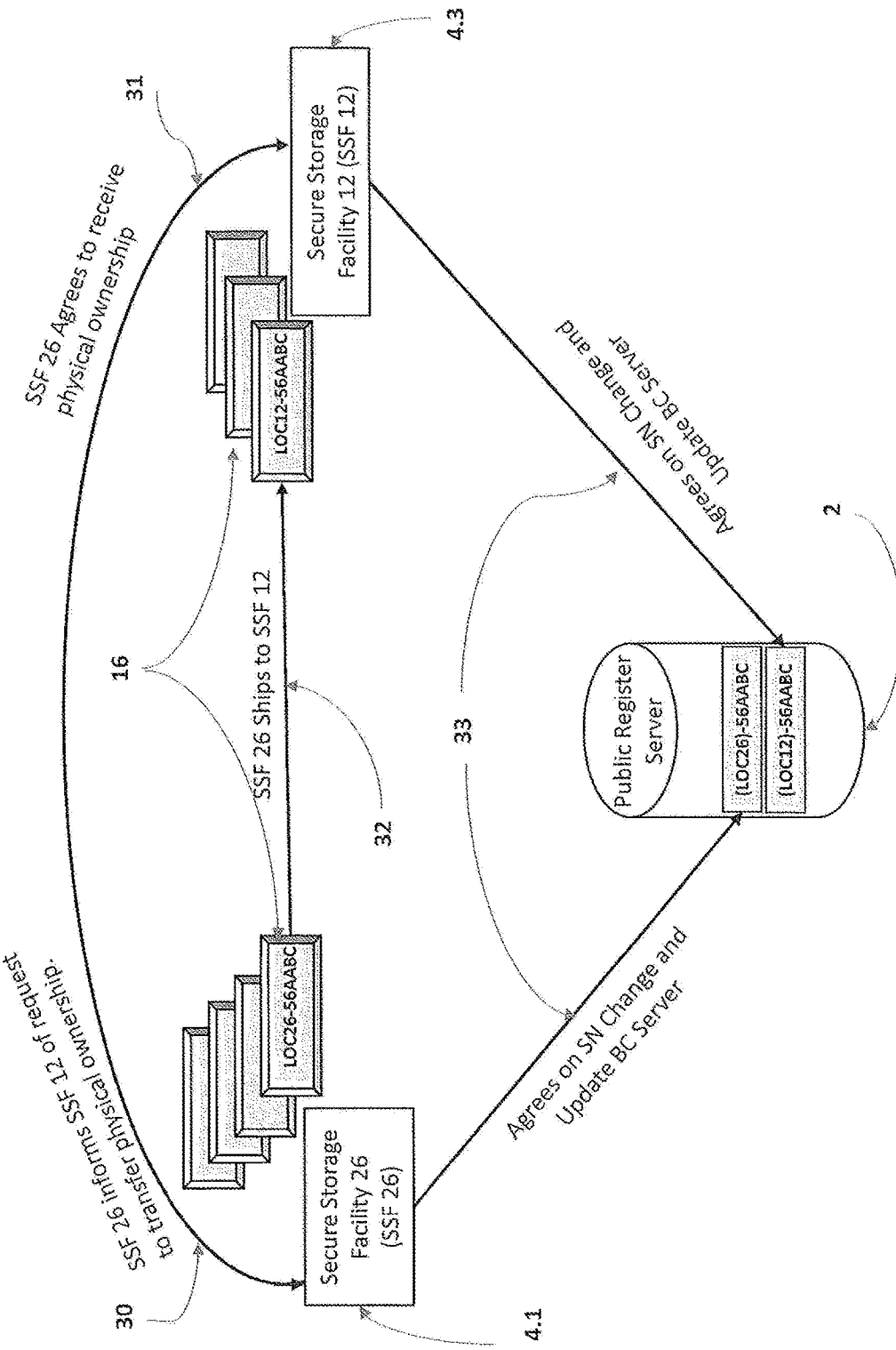
FIG. 7 depicts the process to physically transfer ownership to a new location within the secure environment.

FIG. 7 depicts physical transfer of ownership between secure storage facilities. Secure storage facility 4.1 informs 30 secure storage facility 4.3 of a request to send or receive physical bars. Secure storage facility 4.3 agrees 31 to the shipping or receiving of physical bars. Secure storage facility 4.1 ships or receives metal bar 16 to secure storage facility 4.2. The public register 2 is updated 33 by both secure storage facilities 4.1, 4.2.

Figure 8:
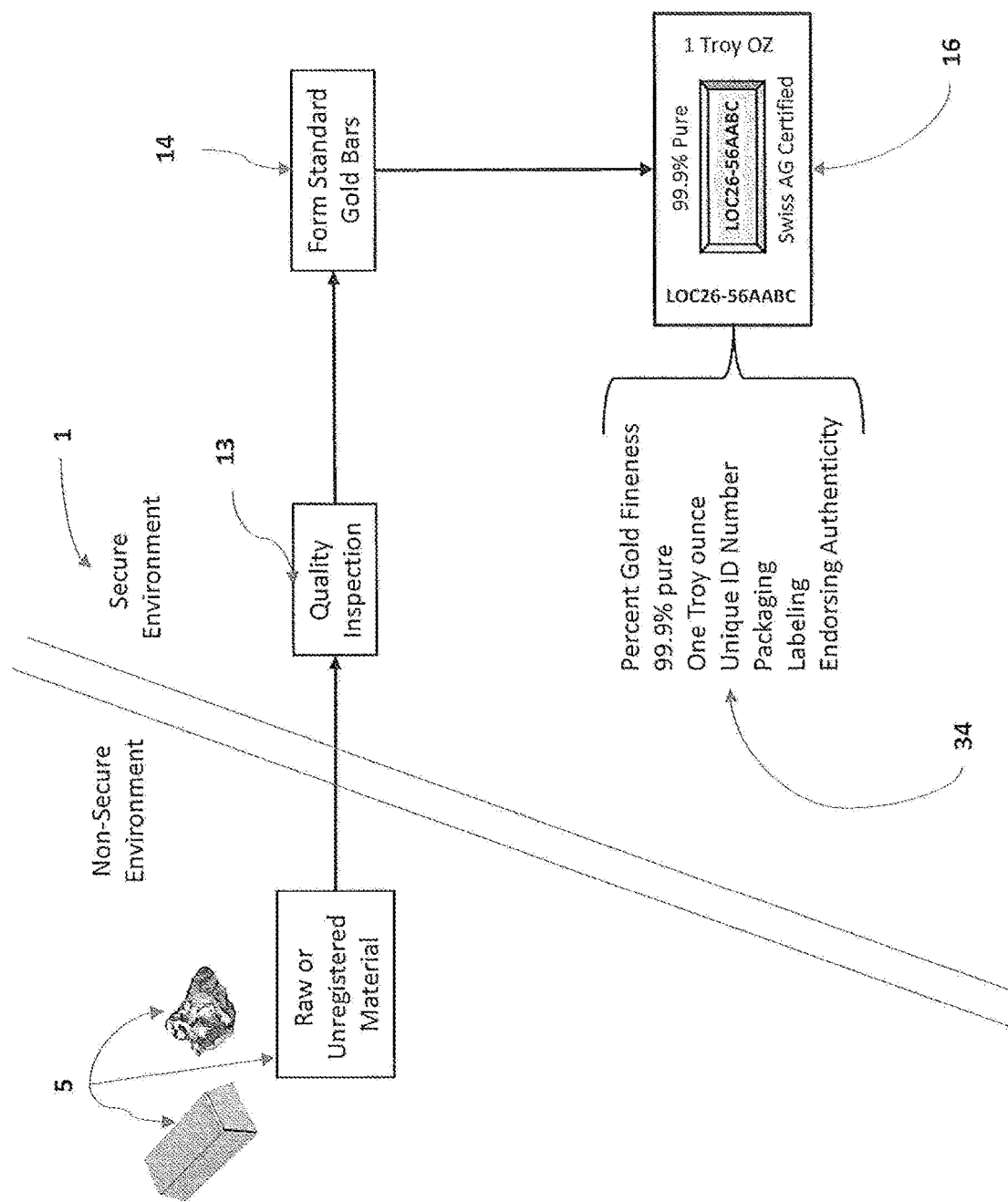
FIG. 8 depicts several quality requirements for metals outside the secure environment to be performed in order to convert to standard metal bars for trading inside the secure environment.

FIG. 8 depicts depositing raw or unregistered material 5 from a non-secure environment 3 into a secure environment 1. The raw or unregistered material 5 goes through quality inspections 13 and metal bars are formed 14. These metal bars 14 meet requirement standards 34 and once properly labeled, they become certified metal bars 16.

Figure 9:
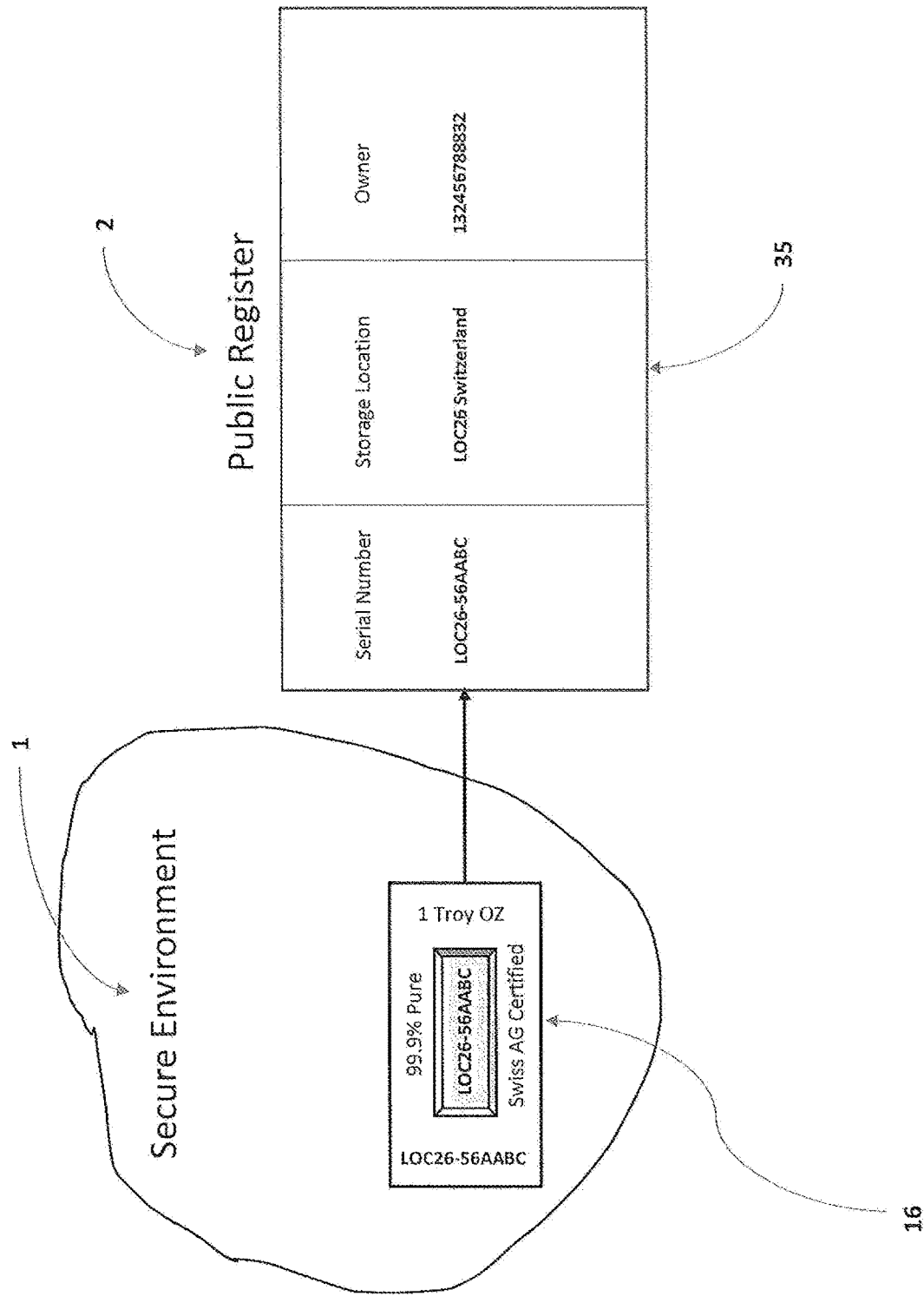
FIG. 9 depicts several data requirements that are on each metal bar and information that would be in the public ledger or blockchain ledger.

FIG. 9 depicts certified metal bars 16 in a secure environment 1 providing to the public register 2 specific identification, storage and owner information 35.

Figure 10:
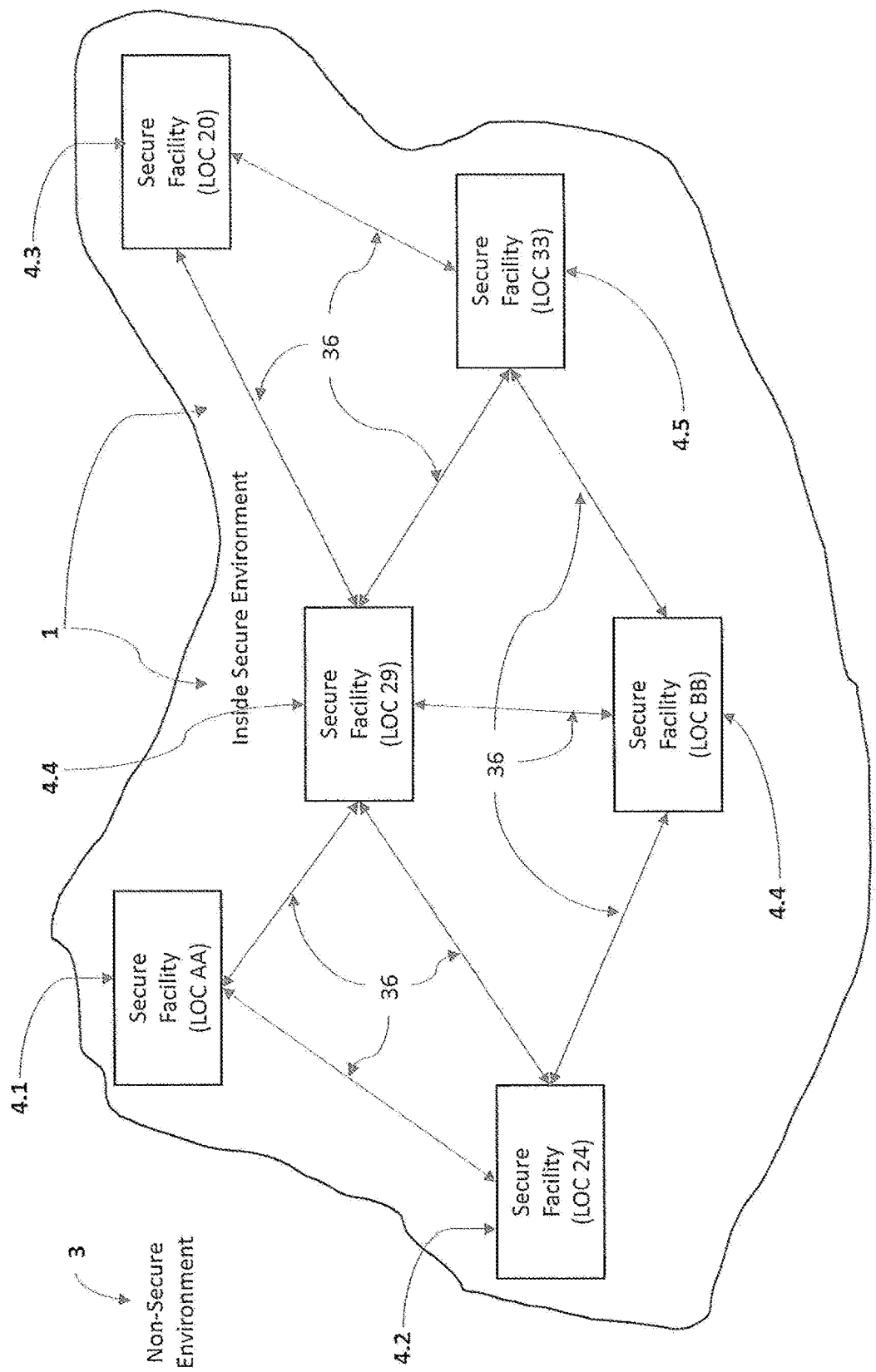
FIG. 10 depicts normal transactions of metals and/or metal bars transitioning throughout the secure environment.

FIG. 10 depicts virtual and physical transactions 36 between secure storage facilities 4.1, 4.2, 4.3, 4.4, and 4.5 inside a secure environment 1.

Figure 11:
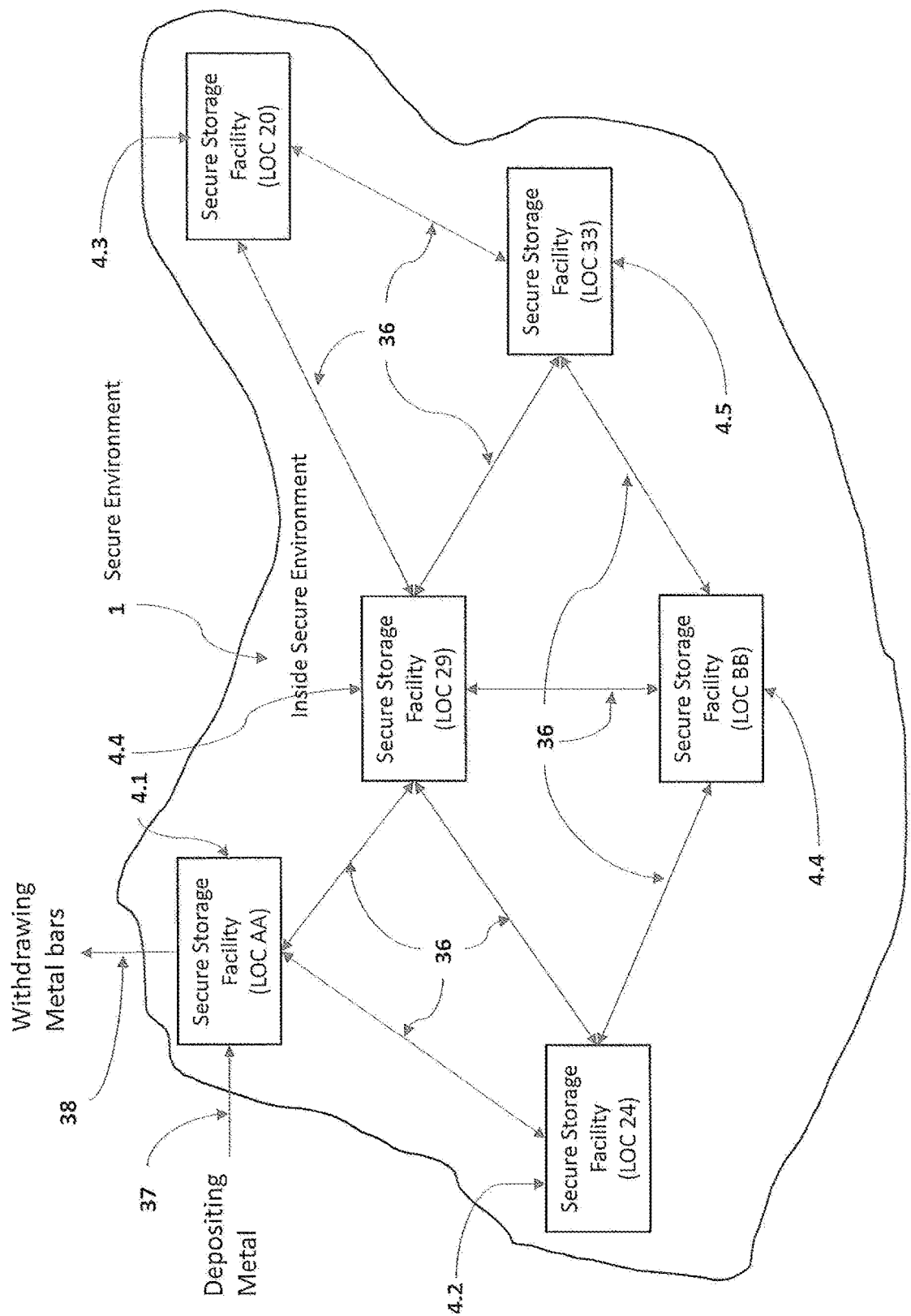
FIG. 11 depicts normal transaction of metals and/or metal bars being deposited into the secure environment, moving around within the secure environment, and withdrawn from the secure environment.

FIG. 11 depicts depositing metals 37 from a non-secure environment 3 to a secure storage facility 4.1, for processing. Once the deposited gold or other metal is processed and in the form of certified metal bars, the metal bar(s) can transfer either virtually or physically 36 between secure storage facilities 4.2, 4.3, 4.4, and 4.5. Certified gold bars can be withdrawn 38 from the secure environment 1 to the non-secure environment 3.

The invention claimed is:
1. A system comprising:
a physically secure environment configured to receive precious metal thereto, retain the precious metal therein, and the release precious metal therefrom; and
a precious metal registration system configured to record precious metal identification information,
ownership status information and ownership information of precious metal,
location information of precious metal, and
certification information and de-processing information of precious metal;
the system further configured to receive precious metal into the physically secure environment by at least one of inspecting a quality of the received precious metal and certifying a quality value of the received precious metal, at least one of receiving the certified precious metal in or processing the certified precious metal into a standard uniform characteristic, and registering the certified precious metal in the standard uniform characteristic in the registration system by providing a registration indicia on one of the registered precious metal or a container containing the registered precious metal, and a corresponding registration record in a precious metal registration database of the registration system;

the system further configured to retain and manage precious metal within the physically secure environment by assigning an ownership record associated with one particular registered precious metal of the standard uniform characteristic from a first owner to a second owner, transferring the one particular registered precious metal of the standard uniform characteristic from a first storage facility within the physically secure environment to a second storage facility within the physically secure environment, and assigning an unassigned registered precious metal of the standard uniform characteristic to a third owner and updating the assigned registered precious metal of the standard uniform characteristic in the registration system with ownership information of the third owner; and the system further configured to release registered precious metal of the standard uniform characteristic from the physically secure environment by de-processing precious metal in the standard uniform characteristic by removing location information from a corresponding registration record in the precious metal registration database, and physically removing the de-processed precious metal from the physically secure environment.

2. The system of claim 1, wherein the physically secure environment further comprises a plurality of storage facilities.

3. The system of claim 1, wherein the physically secure environment further comprises a secure transportation system that transports the precious metal between at least two remote storage facilities.

4. The system of claim 1, wherein the precious metal comprises at least one from the group of gold and silver.

5. The system of claim 1, wherein the precious metal identification information comprises a unique identification number for a smallest indivisible unit of the precious metal stored within the physically secure environment.

6. The system of claim 1, wherein ownership status information comprises one of an unassigned ownership status or an assigned ownership status.

7. The system of claim 1, wherein the ownership information comprises ownership entity identification information.

8. The system of claim 1, wherein location information comprises at least one of a location of origination or a location of reception into the physically secure environment and a location of current disposition within the physically secure environment.

9. The system of claim 1, wherein certification information comprises information related to one of a particular standard of quality of the precious metal or a particular standard of composition of the precious metal.

10. The system of claim 1, wherein the de-certification information comprises information indicating a voided previous certification for the precious metal.

11. The system of claim 1, wherein the certified quality or the quality of the received precious metal comprises one of a standard of purity value or a standard of composition quantity.

12. The system of claim 11, wherein the standard uniform characteristic comprises a non-divisible weight or mass when the certified precious metal is received into and retained within the physically secure environment, and one of the standard of purity value or the standard of composition quantity.

13. The system of claim 1, wherein the registration indicia comprises a received location indicia, certification indicia and a unique identifier indicia.

14. The system of claim 1, wherein transferring further comprises a secure transportation system within the physically secure environment.

15. The system of claim 1, wherein the first and second storage facilities are located in one of distinct geographic locations or country having a secure transportation system connected between the first and second storage facilities.

16. The system of claim 1, wherein the first and second storage facilities are located in one of a same geographic location or country.

17. A system comprising:
a physically secure environment configured to receive precious metal thereto, retain the precious metal therein, and the release precious metal therefrom; and a precious metal registration system configured to record ownership status information and ownership information of precious metal, and
location information of precious metal;

the system further configured to receive precious metal into the physically secure environment by at least one of inspecting a quality of the received precious metal and certifying a quality value of the received precious metal, at least one of processing the certified precious metal into a standard uniform characteristic, and registering the certified precious metal in the standard uniform characteristic in the registration system by providing a registration information indicia on one of the registered precious metal or a container containing the registered precious metal, and a corresponding registration record in a precious metal registration database of the registration system;

the system further configured to retain and manage precious metal within the physically secure environment by assigning an ownership record associated with one particular registered precious metal of the standard uniform characteristic between owners; and the system further configured to release registered precious metal of the standard uniform characteristic from the physically secure environment by de-processing precious metal in the standard uniform characteristic by removing location information from a corresponding registration record in the precious metal registration database, and physically removing the de-processed precious metal from the physically secure environment.

18. The system of claim 17, wherein the system is further configured to retain and manage precious metal within the physically secure environment by assigning an unassigned registered precious metal of the standard uniform characteristic to an owner and updating the assigned registered precious metal of the standard uniform characteristic in the registration system with ownership information of the owner.

19. The system of claim 17, wherein the system is further configured to retain and manage precious metal within the physically secure environment by transferring the one particular registered precious metal of the standard uniform characteristic from a first storage facility within the physically secure environment to a second storage facility within the physically secure environment.

\* \* \* \* \*